Oct. 25, 1966   M. F. DAVIS   3,281,186
CONVERTIBLE MULTI-PURPOSE VEHICLE
Filed Aug. 3, 1964   2 Sheets-Sheet 1

INVENTOR
MILTON F. DAVIS
BY Karl W. Flocks
ATTORNEY

Oct. 25, 1966    M. F. DAVIS    3,281,186
CONVERTIBLE MULTI-PURPOSE VEHICLE
Filed Aug. 3, 1964    2 Sheets-Sheet 2
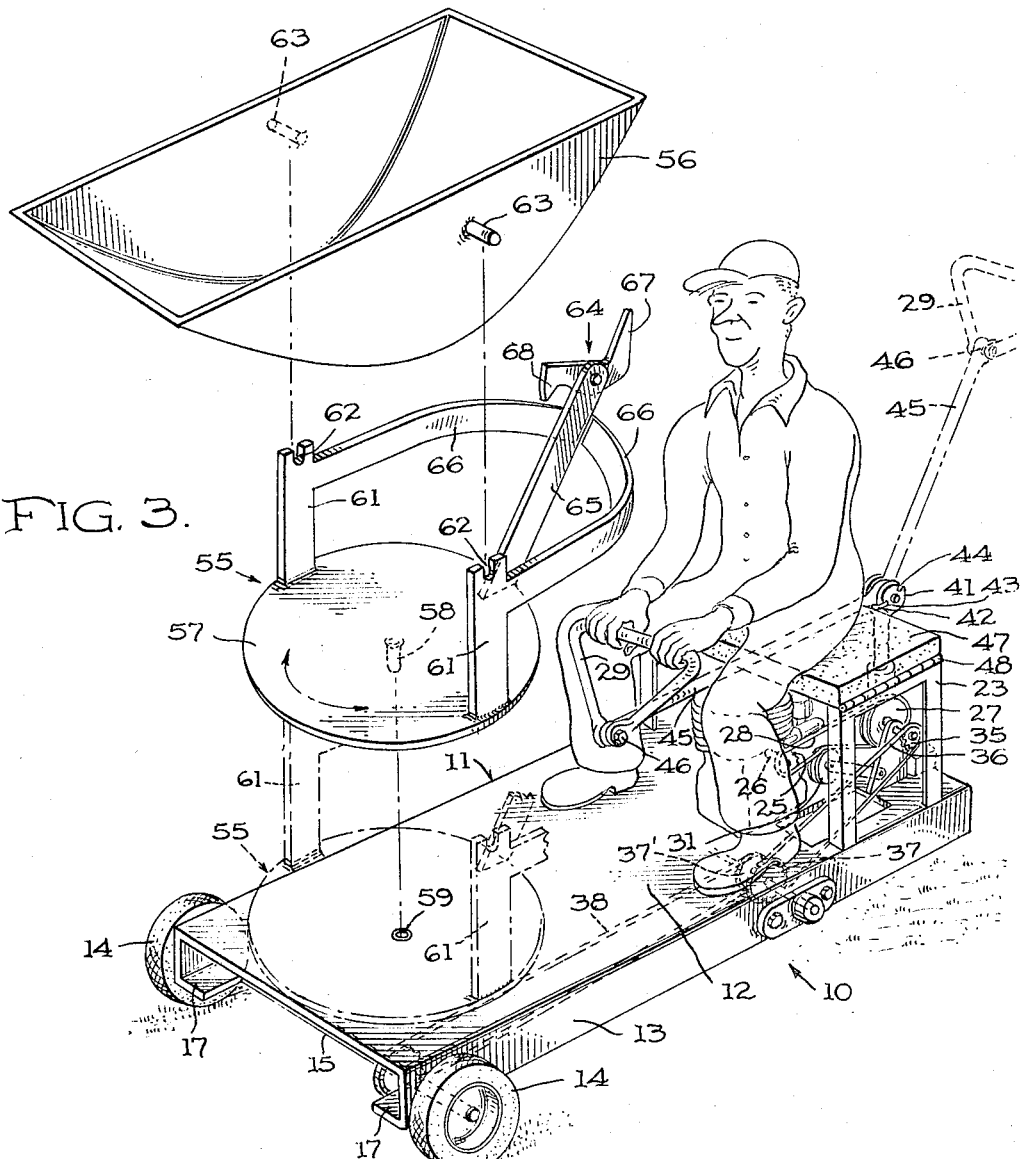
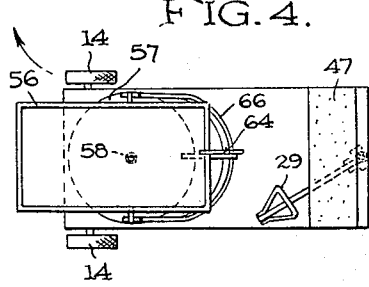
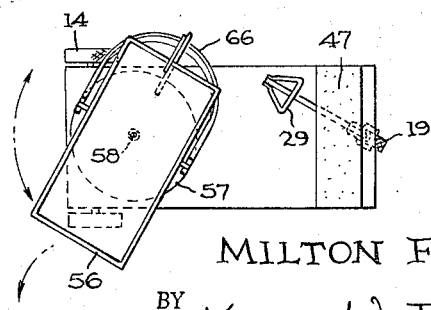
INVENTOR
MILTON F. DAVIS
BY KARL W. FLOCKS
ATTORNEY

United States Patent Office 3,281,186
Patented Oct. 25, 1966

3,281,186
CONVERTIBLE MULTI-PURPOSE VEHICLE
Milton F. Davis, 3644 Miami Cove, Memphis, Tenn.
Filed Aug. 3, 1964, Ser. No. 387,148
8 Claims. (Cl. 298—2)

The present invention relates to a multi-purpose power driven vehicle that easily adapts to conversion for various uses, and has particular reference to a vehicle that may be used with a trough or a flat bed arrangement and may be steered from behind or may be ridden by the operator when a load is not being transported on the vehicle.

Accordingly, the present invention is directed to a safe, inexpensive power vehicle for small hauling jobs. With a trough installed thereon the vehicle can be used for hauling dirt, concrete, sand, liquid, etc. With the trough removed and the bracket holding the trough also removed, the vehicle can be used to haul such items as bricks, or any other items that may be conveniently hauled on a flat bed vehicle. Other conversion accessories may be used for installation on the frame housing that will increase the size of the flat bed and increase the hauling capacity.

Also, it is an object of this invention to provide a hauling vehicle which may conveniently dump its contents forwardly or to either side of the vehicle as is most convenient for the operator and the use of said vehicle.

It is a further object of this invention to provide a vehicle behind which the operator may walk while controlling the vehicle and upon which the operator may ride after disposing of the load on the vehicle and while returning for additional loads of material.

The above and other objects and advantages of the invention will become apparent upon full consideration of the following detailed description and accompanying drawings of an embodiment of the invention in which:

FIG. 3 is a partially exploded view of the vehicle; and

FIGS. 4 and 5 are plan views of the vehicle showing alternative dumping positions and handle positions for steering the vehicle when ridden by the operator as in FIG. 3.

Figure 1:
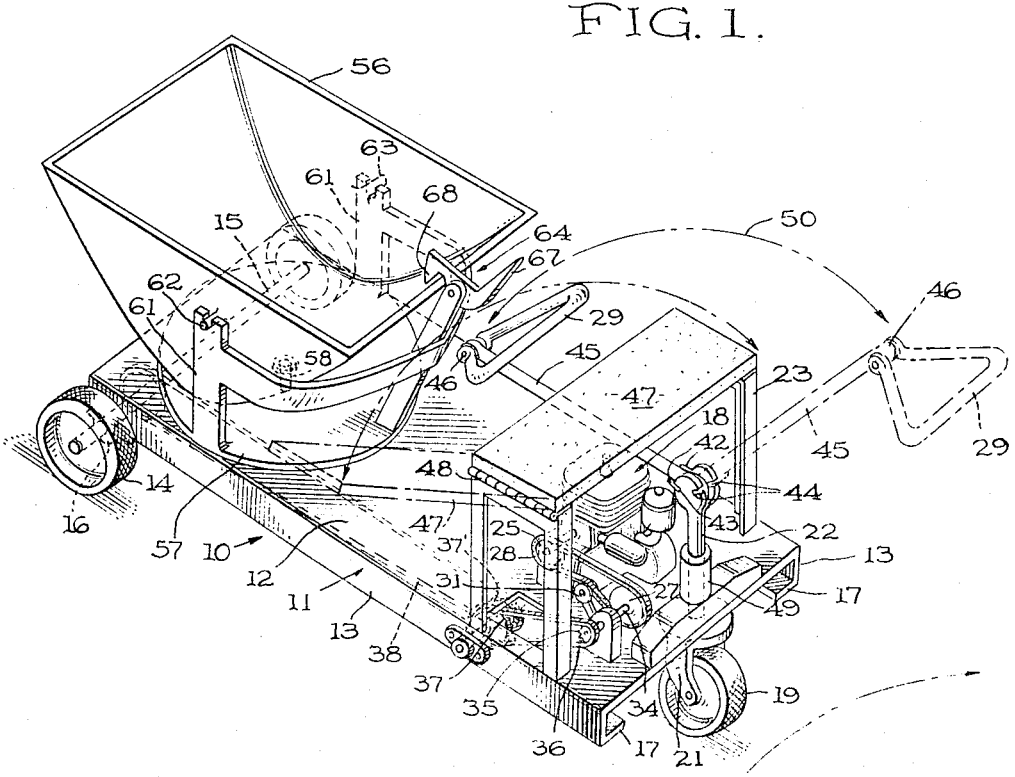
FIG. 1 is a left side rear perspective view of the vehicle of the present invention.
Figure 2:
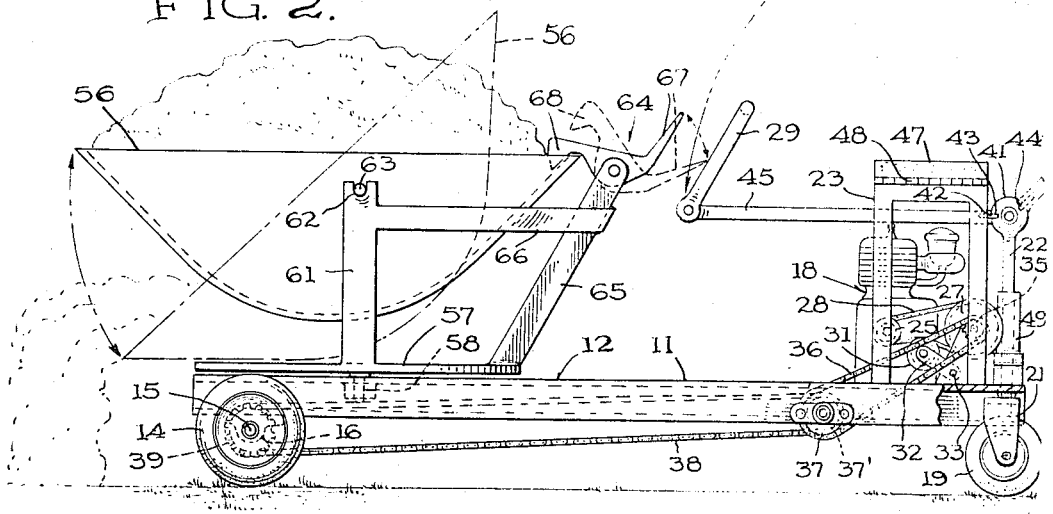
FIG. 2 is a side elevation of the vehicle of FIG. 1.

Considering now the details of an embodiment of the present invention, there is shown in FIGS. 1, 2 and 3 a multi-purpose vehicle 10 having a frame 11 with a substantially flat horizontal top portion 12 and downward extending sides 13. A pair of fixed directional wheels 14 are mounted on axle 15 attached at the forward portion of vehicle 10. In the particular embodiment illustrated, axle 15 is mounted through bearings 16 attached on inward extending lips 17 forming part of frame 11. On the opposite end of frame 11 on its upper surface is mounted a small engine 18. Extending below the frame is a caster wheel 19 mounted on forked member 21 attached to a vertical arm 22. In a position forward of vertical arm 22 and straddling engine 18 there is a bench structure 23 attached to frame 11.

Any suitable type of engine 18 may be used on this vehicle, of course, depending upon the size of the vehicle and the loads which are to be transported thereon. In engine 18 as illustrated, a driving pulley 25 is mounted on motor shaft 26 and connected to a driven pulley 27 by means of flexible belt 28. The spacing between pulleys 25 and 27 is adjusted to be somewhat less than proper to communicate drive directly through the belt 28. Because of this slack the motor shaft 26 may turn free without driving the pulley 27. Conventional throttle and clutch controls, not shown, are mounted at a convenient position near handle 29 to be always within convenient reach of the operator of the vehicle and by means of this clutch control the operator may control the movement of idler pulley 31 which is moved so as to contact the belt between pulleys 25 and 27 and thereby take up the slack as shown in FIGS. 1 and 2. As illustrated in these figures, the idler pulley 31 is mounted on a rod 32 which is journaled to rotate upon a bolt 33 connected to a member attached to frame 11. The idler pulley 31 is therefore free to swing arcuately, upwardly and downwardly about the pivot point established by rod 32 and bolt 33. As the rod 32, and therefore idler pulley 31, is pulled upward by means of the clutch control, the idler pulley 31 engages the belt 28 so as to take up the slack therein and communicate the drive from pulley 25 to pulley 27. Mounted on the same shaft 34 is a sprocket 35 of smaller diameter than driven pulley 27, thereby constituting a speed reduction combination. A drive chain 36 drives the intermediate sprocket 37 from driving sprocket 35. Intermediate sprocket 37 is mounted on a shaft and bearing attached to the overhanging side of frame 11. A final drive chain 38 supplies power from a smaller intermediate sprocket 37', on the same shaft with sprocket 37, to a larger front drive sprocket 39 for further speed reduction and greater power. The embodiment of the vehicle illustrated uses a three-wheel running gear with power applied to the pair of directionally fixed wheels 14 for maximum traction purposes, since the greater weight of the loads carried by the vehicle is applied nearer the front end of this vehicle.

Vehicle 10 may be steered by the swiveling of caster wheel 19 through movement of handle 29 by the operator of the vehicle. Vertical arm 22 which is attached to fork member 21 through bearing 49 attached to frame 11 rotates with both fork member 21 and caster wheel 19. At the top end of vertical arm 22 there is located a pivotal bearing arrangement 41 and a spring loaded catch 42. Arm 45 is attached to vertical arm 22 at this pivotal bearing arrangement 41 and has handle 29 also pivotally mounted at point 46 on its opposite end. The two arrangements for handle 29 allowed by pivotal attachment at 41 and 46 are shown in FIGS. 1 and 3. If the vehicle is carrying a heavy load and the operator is following behind the vehicle and controlling it from that position, then the handle 29 and associated connecting arm 45 are in the position shown in dashed outline in FIGS. 1 and 3. On the other hand, if the operator has disposed of the load and is riding the vehicle as shown in FIG. 3, then the handle is in the forward lowered position shown in full lines in FIGS. 1 and 3 and also in FIG. 2. In this forward lowered position the handle 29 and arm 45 are in a locked position in relation to vertical arm 22 with spring loaded catch 42 locked in slots 43. For the position shown in dashed outline the spring loaded catch 42 would lock in slots 44. When it is required to change the position of handle 29 and attached arm 45 from its rear position to the lowered forward position or vice versa, the seat board 47 is rotated about hinge 48 to the dashed outline position shown in FIG. 1 thereby allowing movement of handle 29 and connecting arm 45 through arc 50.

When in the forward lowered position with the operator riding the vehicle as in FIG. 3, the handle 29 and connecting arm 45 may be moved as shown in FIGS. 4 and 5 for right or left turns respectively. This movement of handle 29 and attached arm 45 causes the rotation of vertical arm 22 thereby rotating caster wheel 19.

With turntable 55 and trough 56 removed from vehicle 10 the vehicle may be used for hauling articles requiring a flat bed arrangement, utilizing frame 11. On the other hand, when such articles such as sand or liquid are to be moved and it is required that a receptacle be mounted on the vehicle for this purpose, a turntable 55 having a flat turntable base 57 with a vertical pin 58 mounted beneath its center may be mounted on the vehicle by the insertion of the turntable pin 58 into a bushing 59 mounted in the horizontal surface 12 near the forward portion of frame 11.

On diametrically opposite sides of turntable base 57 there are mounted vertical side brackets 61 firmly attached on their lower ends to turntable base 57 and having forked bearings 62 on their upper ends. A trough 56 having pins 63 extending horizontally from its sides, so placed as to easily drop into forked bearings 62 or just as easily disengage from said fork bearings when the trough is raised clear of turntable 55, is shown in the exploded portion of FIG. 3. Trough pins 63 are placed off center so that the center of gravity of a load carried by trough 56 will be toward the forward end of the trough. Upon release of latch 64 the trough 56 will tip forward automatically and dump its load as shown in FIG. 2. Latch 64 is merely a latch of the over center type. It is pivotally mounted on inclined bar 65 which is additionally supported by bracing member 66 attached to side brackets 61 and partially encircling trough 56. Due to the pivotal mounting of latch 64 a pull downwardly on handle 67 of said latch will raise hooked end 68 thereby moving the latch from the full line position to the dashed outline position shown in FIG. 2 and thereby release trough 56 to dump its contents as also shown in the same figure.

While the contents of the trough may be dumped toward the forward end of the vehicle as shown in FIG. 2, these contents may also be dumped to either side of the vehicle since the trough 56 may be rotated in either direction because of the turntable arrangement of this structure. Such rotation of trough 56 during its use is illustrated in FIG. 5.

Other latching arrangements besides the type shown may be substituted, and for further convenience of the operator, for instance, an additional pin on the trough and a foot operated latch may be used instead of the latch shown.

It will be obvious to those skilled in the art that various changes may be made without departing from the scope of the invention and therefore the invention is not limited to what is shown in the drawings and described in the specification but only as indicated in the appended claims.

What is claimed is:
1. A vehicle comprising
 a frame having a substantially uninterruptedly level horizontal surface portion;
 a pair of spaced wheels mounted at one end of said frame with their topmost portion below the level of the horizontal surface portion of said frame;
 at least one wheel mounted at the opposite end of said frame from said pair of spaced wheels;
 a seat mounted on said frame;
 steering means adapted for steering said vehicle from a seated position on said vehicle or a walking position rearwardly of said vehicle;
 a removable turntable mounted on said frame including
  a turntable base,
  a pin depending from said turntable base,
  and support means mounted on said turntable base;
 means mounted in said frame to loosely receive said pin whereby said turntable is easily detachable from said frame leaving said substantially uninterruptedly level horizontal surface portion for carrying purposes;
 and an engine mounted on said horizontal frame at the opposite end from said turntable.

2. The vehicle of claim 1, further characterized by a receptacle mounted off its center of gravity on said support means on said turntable base.

3. The vehicle of claim 1, further characterized by said frame having depending sides and inward extending lips from the bottom of said depending sides;
 an axle mounting said pair of spaced wheels which are fixed directional wheels, with said axle attached to said inward extending lips;
 a sprocket mounted on a shaft journaled in said depending sides of said frame and located between said engine and said fixed directional wheels;
 clutched drive means connecting said engine to said sprocket;
 an additional drive means from said sprocket to said axle mounting fixed directional wheels.

4. A vehicle comprising
 a frame having a substantially horizontal surface portion;
 a removable turntable mounted on said frame including
  a turntable base,
  a pin depending from said turntable base,
  and vertical support members mounted on said turntable base having forked receiving means on the tops thereof;
 bushing means mounted in said frame to loosely receive said pin whereby said turntable is easily detachable from said frame;
 a receptacle having sideward extending horizontal pins located off-center from the center of gravity of the receptacle when loaded;
 latching means attached to said turntable to hold said receptacle against tipping;
 an engine mounted on said frame;
 a seating structure over said engine including
  supporting vertical structure attached near opposite side edges of said frame,
  and a seat board hingedly connected to supporting vertical structure near one side of said frame and resting on supporting vertical structure near the opposite side edge of said frame;
 means driven by said engine to supply motive power for the vehicle;
 and means to steer the vehicle including
  a caster wheel mechanism mounted below said frame and adjacent said engine,
  a vertical member attached to said caster wheel mechanism for rotation therewith,
  and a connecting member pivotally connected to said vertical member at a height below that of said seat board and above that of said engine.

5. A vehicle comprising
 a frame having a substantially uninterruptedly level horizontal surface portion;
 a removable turntable mounted on said frame including
  a turntable base,
  a pin depending from said turntable base,
  and support means mounted on said turntable base;
 means mounted in said frame to loosely receive said pin whereby said turntable is easily detachable from said frame leaving said substantially uninterruptedly level horizontal surface portion for carrying purposes;
 an engine mounted on said frame on the opposite end of the vehicle from said turntable;
 means attached to said engine to move the vehicle;
 a seating structure straddling said engine having a seat board hinged at one end;
 a caster wheel mechanism mounted beneath said frame near said engine;
 a vertical member attached to said caster wheel mechanism and rotatable therewith;
 and a connecting member pivotally attached to said vertical member at a height below the level of said seat board whereby when said connecting member is in a substantially horizontal position it can extend through said seating structure beneath said seat board.

6. The vehicle of claim 5, further characterized by means to lock said connecting member in one of at least two different positions relative to said vertical member.

7. The vehicle of claim 6 further characterized by a substantially closed loop handle pivotally attached to said connecting member.

8. A vehicle comprising
a frame having a substantially uninterruptedly level horizontal surface portion;
removable vertical support means mounted on said frame;
a receptacle mounted off its center of gravity on said removable vertical support means;
latching means attached to said support means to hold said receptacle against tipping;
an engine mounted on said frame on the opposite end of the vehicle from said removable vertical support means;
means attached to said engine to move the vehicle;
a seating structure straddling said engine having a seat board hinged at one end;
a caster wheel mechanism mounted beneath said frame near said engine;
a vertical member attached to said caster wheel mechanism and rotatable therewith;
and a connecting member pivotally attached to said vertical member at a height below the level of said seat board whereby when said connecting member is in a substantially horizontal position it can extend through said seating structure beneath said seat board.

References Cited by the Examiner

UNITED STATES PATENTS

| | | | |
|---|---|---|---|
| 1,922,776 | 8/1933 | Nichols | 254—166 |
| 2,207,447 | 7/1940 | Viles. | |
| 2,792,718 | 5/1957 | Ellison | 180—27 |
| 2,887,339 | 5/1957 | Reid | 298—17 X |

FOREIGN PATENTS

| | | |
|---|---|---|
| 26,606 | 1913 | Great Britain. |
| 544,065 | 3/1942 | Great Britain. |
| 630,518 | 10/1949 | Great Britain. |

BENJAMIN HERSH, *Primary Examiner.*

R. JOHNSON, *Assistant Examiner.*